(12) United States Patent
Murakami

(10) Patent No.: US 6,987,589 B2
(45) Date of Patent: Jan. 17, 2006

(54) IMAGE PROCESSING DEVICE FOR CARRYING OUT DODGING TREATMENT

(75) Inventor: Hiroshi Murakami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 549 days.

(21) Appl. No.: 09/849,477

(22) Filed: May 7, 2001

(65) Prior Publication Data

US 2001/0016081 A1    Aug. 23, 2001

Related U.S. Application Data

(62) Division of application No. 08/873,463, filed on Jun. 12, 1997, now Pat. No. 6,256,424.

(30) Foreign Application Priority Data

Jun. 13, 1996  (JP) .................................. 8-152319

(51) Int. Cl.
*G06K 15/00* (2006.01)
*H04N 1/40* (2006.01)

(52) U.S. Cl. ...................... 358/3.27; 358/1.9; 358/518; 358/520; 382/254

(58) Field of Classification Search .......... 358/1.1–1.9, 358/1.11–1.18, 512, 517, 520, 527, 532, 537, 358/447, 474, 3.27, 3.15, 530, 518; 382/169, 382/132, 274, 263, 260, 261, 266, 254

See application file for complete search history.

(56) References Cited

U.S. PATENT DOCUMENTS

| 2,891,722 A | 6/1959 | Nuttall et al. ................. 377/11 |
| 3,868,636 A | 2/1975 | Schlang ...................... 382/193 |
| 4,104,616 A | 8/1978 | Isshiki et al. ............... 382/193 |
| 4,473,845 A | 9/1984 | Davy .......................... 348/616 |
| 5,012,333 A * | 4/1991 | Lee et al. .................... 358/520 |
| 5,269,313 A | 12/1993 | DePinto ..................... 600/508 |
| 5,568,270 A | 10/1996 | Endo .......................... 358/475 |
| 5,682,443 A | 10/1997 | Gouch et al. ............... 382/254 |
| 6,256,424 B1 * | 7/2001 | Murakami ................. 382/260 |
| 6,674,544 B2 * | 1/2004 | Shiota et al. ............... 358/1.9 |
| 6,694,052 B1 * | 2/2004 | Matama ..................... 382/169 |

* cited by examiner

*Primary Examiner*—King Y. Poon
(74) *Attorney, Agent, or Firm*—Birch, Stewart, Kolasch & Birch, LLP

(57) ABSTRACT

An image filter circuit generates unsharp image signals to subject image signals to a dodging treatment which adjusts areas of exposure over an entire image within an image processing apparatus for image processing the image signals. The circuit includes an IIR type filter for carrying out a filtering treatment to generate the unsharp image signals. It further includes a FIFO type field memory for delaying image signals which are not subjected to the filtering treatment at the hR filter for a time corresponding to the delay time of image signals which have been subjected to the filtering treatment at the IIR type filter. The image filter circuit, which obtains the unsharp image signals corresponding to an unsharp mask for obtaining a dodging effect, can be made small in size with a simplified circuit arrangement.

8 Claims, 3 Drawing Sheets

IMAGE PROCESSING DEVICE FOR CARRYING OUT DODGING TREATMENT

This application is a divisional of Application No. 08/873,463, filed on Jun. 12, 1997, now U.S. Pat. No. 6,256,424, the entire contents of which are hereby incorporated by reference.

BACKGROUND OF THE INVENTION

1. Field of the Invention

The present invention relates to an image filter circuit for generating unsharp image signals used to subject image signals to dodging treatment in an image processing apparatus for image processing the image signals.

2. Description of the Related Art

At present, an image recorded on a photographic film such as a negative film, a reversal film and the like (hereinafter referred to as a film) is printed to a photosensitive material such as a photographic paper and the like by so-called direct exposure in which the photosensitive material is subjected to areal exposure by being projected with an image recorded on a film.

Recently, research of printers making use of digital exposure, that is, digital photo printers has been carried out. In the digital photo printers, after image information which has been recorded on a film is photoelectrically read out, the read-out image information is converted as image signals to be recorded by being subjected to various kinds of digital image processing. Then, a photosensitive material is scanned with and exposed to recording light which has been modulated in accordance with the image signals to thereby record an image (a latent image) and the recorded image is developed, thus, the photographic print is obtained.

Basically, the digital photo printers are composed of an image reading apparatus for photoelectrically reading out an image recorded on a film, an image processing (setup) apparatus for subjecting a read-out image to image processing and determining exposure conditions for recording the image, an image recording apparatus for scanning and exposing a photosensitive material in accordance with the thus determined exposure conditions and developing the image and the like.

In the image reading apparatus used in the digital photo printers, reading light produced by a light source impinges upon a film to thereby obtain projected light which carries an image recorded on the film. The image carried by the projected light is formed to an image sensor such as a CCD sensor or the like through an image forming lens, and is read out by subjecting the projected light to photoelectrical conversion in the image sensor. Then, after the thus read image is subjected to various kinds of image processing when necessary, the image is input to the image processing apparatus as the image signals corresponding to the image recorded on a film.

The image processing apparatus sets image processing conditions in accordance with image signals having been input from the image reading apparatus and displays an image in accordance with the image signal on a display apparatus such as a display. After the operator carries out testing and adjusts the image processing conditions when necessary, the image signals are subjected to a desired image processing and are input to the image recording apparatus as output image signals (exposure conditions) for recording the image.

In the image recording apparatus, when it is, for example, an apparatus making use of a light beam scanning exposure, light beams are modulated in accordance with the image signals input from the image processing apparatus and deflected in a main scanning direction. Also, the photosensitive material is conveyed in an auxiliary scanning direction, which is approximately normal to the main scanning direction. In this manner, the photosensitive material is exposed to the light beams to thereby form a latent image. The photosensitive material is then subjected to development processing in accordance with the photosensitive material. A finished print (photograph) on which the image recorded on a film is reproduced is thereby obtained.

In the digital photo printers, since a film is photoelectrically read and exposure conditions are determined after a color/density correction is carried out by signal processing, a period of time during which a single image is exposed is short and the exposure time is fixed to respective values in accordance with an image size. As a result, printing can be promptly carried out as compared with the conventional areal exposure. Editing such as combining of a plurality of images, division of an image, and the like, and image processing such as color/density adjustment and the like, can be carried out freely. Therefore, finished prints having been edited and processed freely in accordance with their use can be output.

Since the images recorded on finished prints can be stored in a recording medium such as a floppy disk and the like as image information, it is not necessary to prepare a film serving as an original image when prints are made additionally. Further, since it is not necessary to determine exposure conditions again, a job can be promptly and simply carried out. In the prints made by the conventional direct exposure, the images recorded on a film or the like cannot be perfectly reproduced in some points such as resolution, color/density reproducibility and the like. However, with the digital photo printers, prints, on which the images (image density information) recorded on a film or the like are reproduced approximately perfectly, can be output.

Incidentally, recording conditions under which an image is recorded on a film are not fixed and there are many cases where a large amount of difference exists between a bright portion and a dark portion as found in an image recorded using an electronic flash, a backlighted scene and the like. When such a film image is exposed by a conventional method and made to a finished print, there is a tendency that details become imperceptible due to insufficient gradation in either one of a bright portion and a dark portion on the print. For example, in cases where a picture of a person is recorded against the light, if the picture is exposed such that the image of a person may be preferably clear, the bright portion, such as a sky region, will become white and its details will become imperceptible. Whereas, if the picture is printed such that the bright portion, such as the sky region, may become preferably clear, the image of the person will become black and its details will become imperceptible.

Therefore, when a photosensitive material is exposed using a film image having a large difference between a bright portion and a dark portion as an original image, there have heretofore been employed a so-called dodging treatment.

The dodging treatment is a method of obtaining a finished print in which a proper image is reproduced over an entire picture in such a manner that an ordinary level of exposure is carried out to a portion having an intermediate image density, an amount of exposure light is increased to a portion where an image tends to become white (a bright portion) and an amount of exposure light is reduced to a portion where an image tends to become black (a dark portion) to thereby correct a very bright portion and a very dark portion of the image recorded on film.

Conventional apparatuses using the areal exposure employs the dodging treatment to locally modify an amount of exposure light in accordance with an image recorded on a film. More specifically, the dodging treatment uses a method of carrying out exposure by inserting a blocking plate, an ND filter or the like into an exposure light passage, a method of locally changing an amount of light produced by an exposure light source, a method of creating monochrome films by reversing the bright portion and the dark portion of an image recorded on film and carrying out exposure by superimposing the films, and the like.

Digital photo printers intend to obtain an effect, which is similar to that obtained by dodging treatment or dodging processing which uses an areal exposure, by subjecting image signals to image processing. This image processing is carried out in such a manner, for example, that the image density of the portion where an image tends to become white is increased, whereas the image density of the portion where the image tends to become black is decreased so that the contrasts in the respective regions of the portion where the image tends to become white and the portion where the image tends to become black are emphasized as well as the contrast of an entire image is adjusted.

The above image processing is carried out such that the image signals are filtered using, for example, a filter to thereby generate unsharp image signals used to carry out dodging treatment. At the time, it is necessary to use a filter large enough to carry out calculation treatment to image signals which cover, for example, 100 pixels×100 pixels to obtain the effect similar to that obtained by the dodging treatment which uses the areal exposure. Thus, a problem arises in that an image filter circuit for carrying out filter treatment is increased in size.

SUMMARY OF THE INVENTION

In view of the problem of prior art, an object of the present invention is to provide an image filter circuit which is small in size and has a simple circuit arrangement to obtain the dodging effect (the effect similar to that obtained by the dodging treatment which uses the areal exposure).

According to the present invention, there is provided an image filter circuit for generating unsharp image signals used to subject image signals to dodging treatment in an image processing apparatus for image processing the image signals, the image filter circuit comprising an IIR type filter for carrying out filtering treatment to generate the unsharp image signals; and a FIFO type field memory for delaying image signals which are not subjected to the filtering treatment at the IIR filter for a time corresponding to the delay time of image signals which have been subjected to the filtering treatment at the IIR type filter.

It is preferred that said IIR type filter is a low-pass filter, an all-pass filter, or the combination thereof.

It is also preferred that said at least one FIFO type field memory comprises more than one FIFO type field memories disposed in parallel, and that writing of said image signals to one FIFO type field memory and reading-out of said image signals from other one FIFO type field memory are carried out sequentially in said more than one FIFO type memories.

It is further preferred that the image filter circuit further comprises a main controller for generating writing signals and reading-out signals of said at least one FIFO type field memory which control the operation timing of said at least one FIFO type field memory in accordance with the delay time of said image signals at said IIR type filter.

It is further preferred that said main controller comprises a first counter which counts the number of pixels in the horizontal and vertical directions of a reproduced image; a first flip-flop which generates said writing signals from the time period when said first counter starts counting the number of pixels in the horizontal and vertical directions of said reproduced image until the end of counting; a second counter which starts counting the number of horizontal and vertical delays of said image signals at said IIR type filter, as soon as said first counter starts counting; a third counter which starts counting the number of horizontal and vertical delays of said image signals at said IIR type filter, after said first counter finished counting; and a second flip-flop which generates said reading-out signals after said second counter finished counting the number of horizontal and vertical delays of said image signals at said IIR type filter, until the time period when said third counter finishes counting the number of horizontal and vertical delays of image signals at said IIR type filter.

DETAILED DESCRIPTION OF THE INVENTION

An embodiment of an image filter circuit of the present invention will be described below with reference to accompanying drawings.

Figure 1:
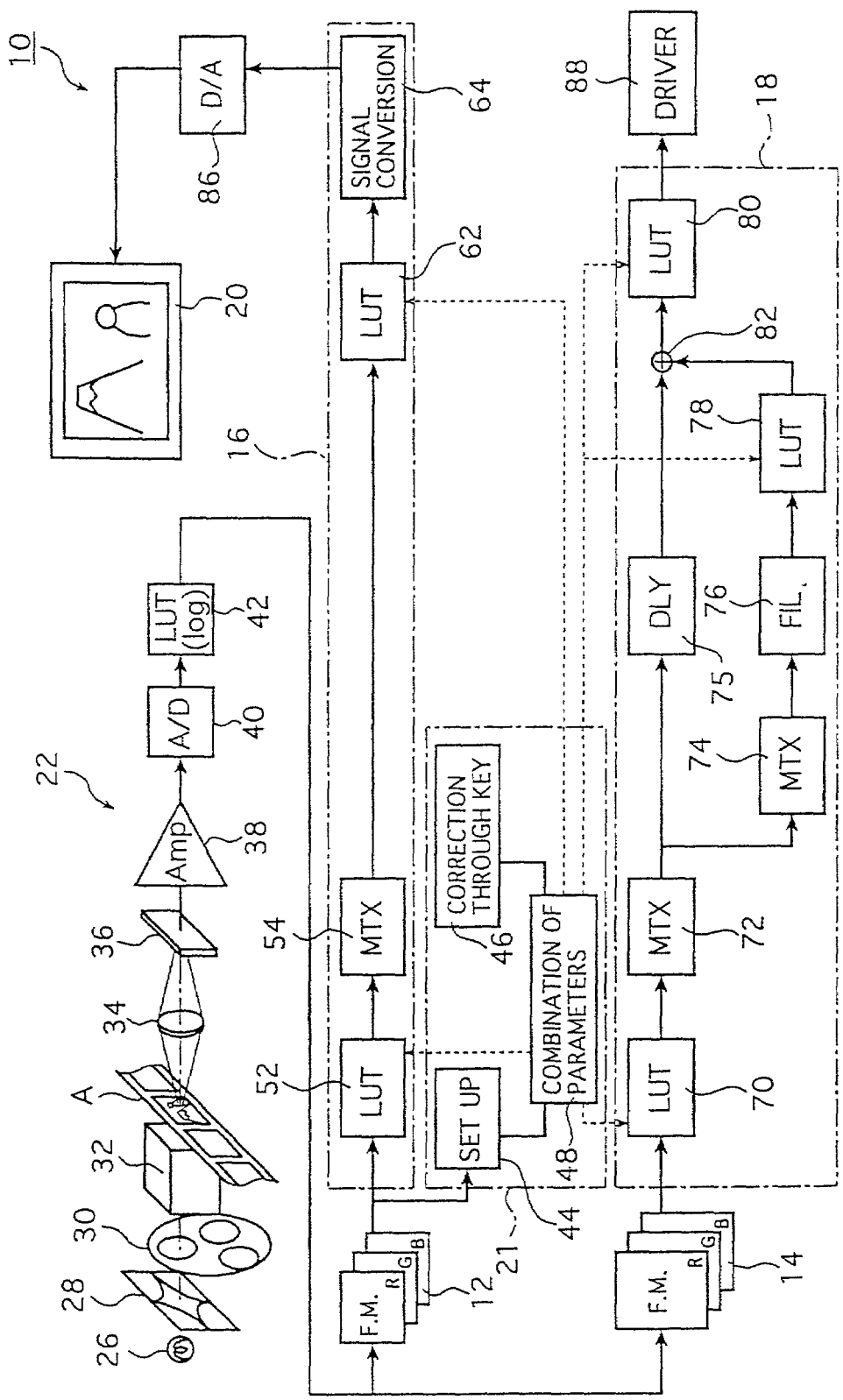
FIG. 1 is a schematic block diagram showing an embodiment of an image processing apparatus using an image filter circuit of the present invention.

FIG. 1 shows a schematic view of an embodiment of an image processing apparatus making use of the image filter circuit of the present invention. An image processing apparatus 10 shown in FIG. 1 processes input image signals read out by an image reading apparatus (hereinafter, referred to as a reading apparatus) 22 and outputs the thus processed input image signals to an image recording apparatus (hereinafter, referred to as a recording apparatus) as output image signals in accordance with a recorded image. A digital photo printer is composed of the reading apparatus 22, the image processing apparatus 10 and the recording apparatus and the like.

The reading apparatus 22 reads out photoelectrically an image recorded on a film A and supplies it to the processing apparatus 10. The reading apparatus includes a light source 26, a variable diaphragm 28, a color filter plate 30 for decomposing the image recorded on the film A to the three primary colors of R (red), G (green) and B (blue), a diffusion box 32, an image forming lens 34, a CCD sensor 36 of the area type, an amplifier 38, an A/D converter 40, and a look-up table (hereinafter, referred to as a LUT) 42 for subjecting signals to log conversion to thereby arrange them as image density signals.

In the reading apparatus 22 as described above, reading-out light produced by the light source 26 impinges upon the film A after the amount of light of the reading-out light is adjusted by the diaphragm 28, the color thereof is adjusted through the color filter plate 30 and the reading-out light is diffused by the diffusion box 32. When the reading light passes through the film A, a projected light carrying an image recorded on the film A is obtained. The image of the projected light is formed on the light receiving surface of the CCD sensor 36 by the image forming lens 34 and photo-electrically read out by the CCD sensor 36.

Output signals output from the CCD sensor 36 are amplified by the amplifier 38, converted into digital signals by the A/D converter 40, converted into image density signals at the LUT 42 and input to the image processing apparatus 10 as the image signals associated with the image recorded on the film A.

The reading apparatus 22 reads out the image recorded on the film A three times by sequentially inserting the red, green and blue filters of the color filter plate 30 and decomposes the image to the three primary colors of red, green and blue.

The image processing apparatus shown in FIG. 1 carries out prescanning for coarsely reading out an image at a low resolution before an image is read (finely scanned) to obtain the output image signals. The image processing apparatus 10 sets up image processing conditions from the image signals obtained from the prescanning and provides output image signals by processing the image signals obtained by the fine scanning in accordance with the image processing conditions to thereby permit a recording apparatus to record the image. The only difference between the prescanning and the fine scanning is the resolution of the image to be read out.

Then, the illustrated image processing apparatus 10 subjects the image signals input from the reading apparatus 22 to various kinds of image processing including dodging treatment which is an image processing to obtain the dodging effect. The image processing apparatus includes a prescan memory 12, a fine scan memory 14, a display image processing section 16, a fine scan image processing section 18, a monitor 20, and an image processing condition setting section (hereinafter, referred to as a condition setting section) 21.

The reading apparatus 22 supplies the prescanned image signals to the prescan memory 12 and stores it therein and supplies the finely scanned image signals to the fine scan memory 14 and store it therein.

The prescan memory 12 and the fine scan memory 14 fundamentally have the same arrangement except that the memories may have a different memory capacity depending on the resolution of the respective image information and for example each of them is composed of three frame memories for storing respectively red image signals, green image signals and blue image signals input from the reading apparatus 22.

The condition setting section 21 includes a setup (processing condition setting) section 44, a key correcting section 46 and a parameter combining section 48.

The setup section 44 is used to set fundamental image processing conditions. The setup section 44 sets image processing conditions such as color/image density processing conditions and the like, from the image signals stored in the prescan memory 12. For example, the setup section 44 generates or adjusts various kinds of tables used in the display image processing section 16 and the fine scan image processing section 18 respectively.

The key correcting section 46 calculates an amount of correction of the image processing conditions, for example in accordance with data input by the operator through an adjustment key and can adjust for example dodging treatment finely.

The parameter combining section 48 combines the image processing conditions set by the setup section 44 with the amount of correction set by the key correcting section 46 to thereby determine final image processing conditions. The final image processing conditions are set in each of the display image processing section 16 and the fine scan image processing section 18. The respective image signals are processed in accordance with the image processing conditions.

Then, the display image processing section 16 subjects the prescanned image signals read out of the prescan memory 12 to various kinds of image processing in accordance with the image processing conditions set by the condition setting section 21 to thereby generate image signals which will be displayed on the monitor 20. The display image processing section 16 includes a LUT 52, a matrix calculator (MTX) 54, a LUT 62 and a signal converter 64.

The fine scan image processing section 18 subjects the finely scanned image signals read out of the fine scan memory 14 to predetermined image processing in accordance with the image processing conditions set by the condition setting section 21 and further carries out the dodging treatment when necessary to thereby generate output image signals which will be recorded by the recording apparatus. The fine scan image processing section 18 includes a LUT 70, a MTX 72, a MTX 74, a delay circuit (DLY) 75, a filter (FIL) 76, a LUT 78, a LUT 80 and an adder 82.

The image processing carried out in the display image processing section 16 is fundamentally similar to that carried out in the fine scan image processing section 18 except that the resolution of the image to be read out is different and that the dodging treatment is carried out in the fine scan image processing section 18. Therefore, both the image processing sections 16, 18 will be described below as to the fine scan image processing section 18 as a representative example.

The LUT 70 (the LUT 52) reads out the image signals stored in the fine scan memory 14 (the prescan memory 12) and adjusts the gray balance of the image signals and corrects the brightness and the gradation thereof.

The MTX 72 (the MTX 54) subjects the image signals processed by the LUT 70 to the color correction. That is, the MTX 72 (the MTX 54) carries out a matrix calculation set in accordance with the spectral characteristics of a film A, the spectral characteristics of a photosensitive material, the characteristics of development processing, and the like so that a resulting output image is finished in appropriate colors.

The MTX 74 generates luminance signals from red, green, and blue image signals output from the MTX 72.

The DLY 75 and the FIL 76 constitute an image filter circuit of the present invention. The FIL 76 generates unsharp image signals from the luminance signals generated by the MTX 74 and the DLY 75 delays the image signals output from the MTX 72 for a time corresponding to the delay time of the image signals in the FIL 76. The DLY 75 and the FIL 76 will be described later in details.

When dodging treatment is carried out at the finely scanned image processing section 18, the same image signals subjected to the color correction treatment at the MTX 72 are input to both the DLY 75 and the MTX 74. When no dodging treatment is carried out, the MTX 72 is directly connected to the LUT 80 which will be described later through a bypass and the unsharp image signals are not generated. Whether the dodging treatment is carried out or not is automatically determined and set depending upon the mode selection input carried out by the operator or a result of the calculation executed at the condition setting section 21.

The unsharp image signals generated by the FIL 76 are input to the LUT 78 and subjected to dynamic range compression treatment using a dynamic range compression table obtained from prescanned image signals. The dynamic range compression treatment means to compress the dynamic range of the unsharp image signals output from the FIL 76 so that the maximum signal value and the minimum signal value of the unsharp image signals are set within the range between the minimum image density and the maximum image density of an image to be reproduced.

The adder 82 subtracts the image signals output from the LUT 78, from the image signals output from the DLY 75, that is, subtracts the unsharp image signals generated by the FIL 76 from the image signals subjected to the color correction at the matrix 72. The combination of the image signals having been subjected to the color correction with the unsharp image signals having been subjected to the compression treatment permits a dodging effect to be applied to output image signals.

The LUT 80 (the LUT 62) is the gradation conversion table for converting the image signals subjected to the predetermined processing into image signals in accordance with the characteristics of a final output medium. That is, the LUT 62 converts the gradation of the prescanned image signals so that they are suitably displayed on the monitor 20 and the LUT 80 converts the gradation of the finely scanned image signals so that they are suitably corresponding to the color development of a photosensitive material.

The prescanned image signals output from the LUT 62 as described above is converted into signals corresponding to the monitor 20 by the signal converter 64 and further subjected to D/A conversion by the D/A converter 86 and then displayed on the monitor 20.

The finely scanned image signals output from the LUT 80 is input to the AOM (acoust-optic modulator) driver 88 of the recording apparatus and subjected to image recording in the recording apparatus.

How the image processing apparatus 10 operates will be briefly described below.

When a print creation start command is issued, prescanning is first started at the reading apparatus 22 to read out the image on the film A at a low resolution for example in the order of R, G and B, and stored in the prescan memory 12.

On the completion of the prescanning, fine scanning starts at the reading apparatus 22 and the red image, the green image and the blue image of the image recorded on the film A are sequentially read out and stored in the fine scan memory 14.

On the completion of the prescanning, the setup section 44 of the condition setting section 21 reads out the prescanned image signals from the prescan memory 12, and sets image processing conditions by creating various tables from the prescanned image signals. The parameter combining section 48 transfers the image processing conditions supplied thereto to the LUTs 52 and 62 of the display image processing section 16 and the LUTs 70, 78 and 80 of the fine scan image processing section 18 and sets them as image processing tables.

When the image processing conditions are set, the LUT 52 of the display image processing section 16 reads out the prescanned image signals from the prescan memory 12 and subjects them to various kinds of corrections in accordance with the tables. Thereafter, the image signals are subjected to the color correction at the MTX 54.

Then, the gradation of the image signals output from the MTX 54 is converted at the LUT 62 so that the image signals are arranged as an image which is suitably displayed on the monitor 20. Further, the above image signals are converted into signals in accordance with the display on the monitor 20 at the signal converter 64, converted into analog signals at a D/A converter 86 and displayed on the monitor 20.

The operator carries out testing while viewing the image displayed on the monitor 20 and when necessary, the operator carries out various adjustments using the adjustment key. When data is input through the adjustment key, an amount of correction of the image processing conditions is calculated at the key correcting section 46, the parameter combining section 48 combines the amount of correction with the image processing conditions set by the setup section 44 such that the image processing conditions are set again or changed, the tables set to the respective LUTs 52, 62, 70, 78, 80 of the display image processing section 16 and the fine scan image processing section 18 are changed accordingly.

On the completion of the change of image processing conditions carried out by the operator, finely scanned image signals are read out from the fine scan memory 14 and subjected to various kinds of correction according to the tables at the LUT 70 of the finely scanned image processing section 18 and then subjected to the color correction at the MTX 72.

When no dodging treatment is carried out, the image signals subjected to the color correction at the matrix 72 are directly input to the LUT 80 by bypassing the DLY 75 and the adder 82.

Whereas, when the dodging treatment is carried out, the same image signals are input to the DLY 75 and the MTX 74, luminance image signals are generated at the MTX 74 and converted into unsharp image signals at the FIL 76. Further, the thus obtained unsharp image signals are subjected to the dynamic range compression treatment at the LUT 78 and input to the adder 82 as unsharp image signals for the dodging treatment.

The adder 82 subtracts the unsharp image signals for the dodging treatment from the image signals which have been delayed for a predetermined time at the DLY 75 so that their timing is synchronized and the resultant image signals are input to the driver 88 of the recording apparatus as output image signals which will be used to record an image on a photosensitive material.

The image processing apparatus 10 using the image filter circuit of the present invention is arranged, for example, as described above.

Next, the image filter circuit of the present invention for generating the unsharp image signals in the image processing apparatus 10 will be described below.

Figure 2:
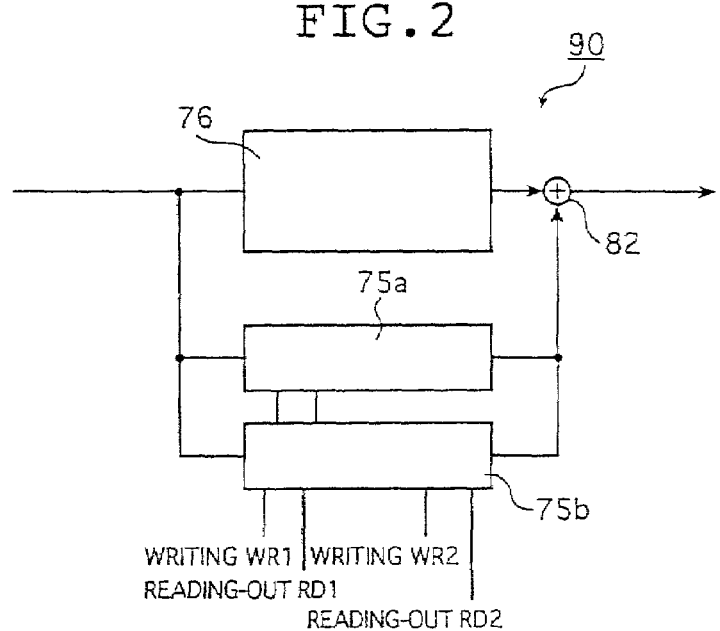
FIG. 2 is a block diagram showing an embodiment of the image filter circuit of the present invention.
Figure 3:
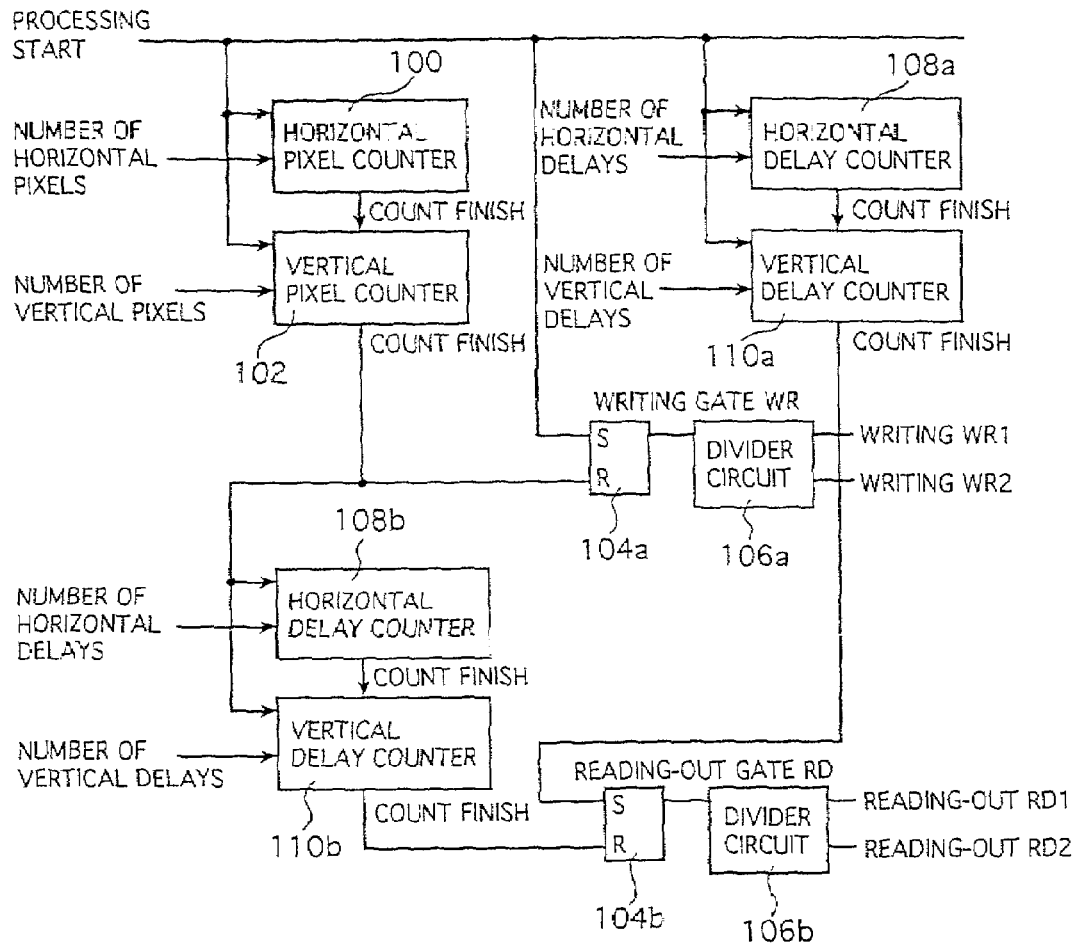
FIG. 3 is a block diagram showing the embodiment of the image filter circuit of the present invention.

FIG. 2 and FIG. 3 are block diagrams of the embodiment of the image filter circuit of the present invention and show the portion which corresponds to the DLY 75, the FIL 76 and the adder 82 in the image processing apparatus 10. As shown in FIG. 2 and FIG. 3, the image filter circuit is fundamentally composed of a filter section 90 for converting the luminance signals into the unsharp image signals and a main controller 92 for controlling the operation timing of the filter section 90.

The filter section 90 includes the FIL 76, and DLYs 75*a* and 75*b*. The image signals are input to the FIL 76 and the DLYs 75*a* and 75*b*. The unsharp image signals output from the FIL 76 and the image signals output from the DLYs 75*a* and 75*b* are input together to the adder 82. A writing signal WR1 and a reading-out signal RD1 are input to the DLY 75*a* and a writing signal WR2 and a reading signal RD2 are input to the DLY 75*b*.

The FIL 76 carries out filtering treatment by shading off the image signals so as to generate the unsharp image signals which correspond to an unsharp image obtained by the dodging treatment carried out at the recording apparatus which uses the areal exposure. The image filter circuit of the present invention employs an infinite impulse response (IIR) type filter as the FIL 76.

Figure 4:
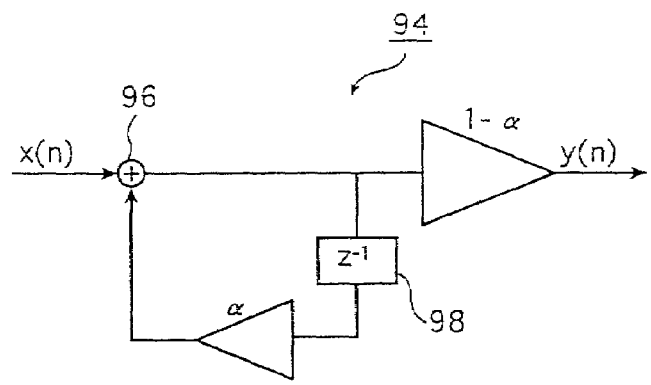
FIG. 4 is a block diagram showing an embodiment of an IIR type filter.

FIG. 4 is a block diagram showing an embodiment of the IIR type filter. An IIR type filter 94 shown in FIG. 4 is an example of a low-pass filter including an adder 96 disposed in a forward direction and a unit delay element 98 disposed in a feedback direction with an I/O signal lines denoted by x(n) and y(n), respectively. The low-pass filter has such characteristics that as a filter coefficient α is set nearer to 1, the cut-off frequency thereof can be set to a low frequency side.

The employment of the IIR type filter as the FIL 76 permits the circuit for generating the unsharp image signals to be miniaturized and there can be obtained an advantage that an unsharp image having been greatly shaded off can be obtained regardless of the fact that the circuit is arranged to the miniature size. Note, the IIR type filter maybe anyone selected from the low-pass filter shown in the above embodiment, an all-pass filter, the combination thereof and the like.

The DLYs 75*a* and 75*b* delay image signals which are not subjected to the filtering treatment by the FIL 76 for a time corresponding to the delay time of image signals which have been subjected to the filtering treatment by the FIL 76. A first-in first-out (FIFO) type field memory is used as a delay circuit in the image filter circuit of the present invention. The illustrated delay circuit employs two FIFO type field memories disposed in parallel with each other so that they alternately carry out writing and reading-out in a unit of two pixels.

Since the FIFO type field memory includes no external address terminal, the employment of the FIFO type field memory as the delay circuit permits the delay circuit to be simply arranged. Further, a capacity can be suitably increased by employing two or more FIFO type field memories as shown in the delay circuit of the illustrated example, so that the delay time of the image signals processed at the FIL 76 can be suitably treated. The number of the FIFO type field memories to be employed and the number of pixels to which reading-out and writing are carried out are not limited.

The main controller 92 generates the writing signals WR1 and WR2 and the reading-out signals RD1 and RD2 which are input to the DLYs 75*a* and 75*b* in the filter section 90 shown in FIG. 2. The main controller 92 is composed of a horizontal pixel counter 100, a vertical pixel counter 102, SR flip-flops 104*a*, 104*b*, divider circuits 106*a*, 106*b*, horizontal delay counters 108*a*, 108*b* and vertical delay counters 110*a*, 110*b*.

The horizontal pixel counter 100 is supplied with a processing start signal, the number of horizontal pixels and a pixel clock (not shown), and outputs a count finish signal.

Likewise, the vertical pixel counter 102 is supplied with the processing start signal, the number of vertical pixels, the count finish signal output from the horizontal pixel counter 100 and the pixel clock (not shown) and outputs a count finish signal.

The horizontal delay counter 108*a* is supplied with the processing start signal, the number of horizontal delays and the pixel clock (not shown) and outputs a count finish signal. Likewise, the vertical delay counter 110*a* is supplied with the processing start signal, the number of vertical delays, the count finish signal output from the horizontal delay counter 108*a* and the pixel clock (not shown) and outputs a count finish signal.

The horizontal delay counter 108*b* is supplied with the count finish signal output from the vertical pixel counter 102, the number of the horizontal delays and the pixel clock (not shown) and outputs a count finish signal. Likewise, the vertical delay counter 110*b* is supplied with the count finish signal output from the vertical pixel counter 102, the number of the vertical delays, the count finish signal output from the horizontal delay counter 108*b* and the pixel clock (not shown) and output a count finish signal.

The SR flip-flop 104*a* is supplied with the processing start signal and the count finish signal output from the vertical pixel counter 102 and outputs a signal to the divider circuit 106*a* which outputs the writing signals WR1 and WR2. Likewise, the SR flip-flop 104*b* is supplied with the count finish signals output from the vertical delay counters 110*a* and 110*b*, respectively. Further, the SR flip-flop 104*b* outputs a signal to the divider circuit 106*b* from which the reading-out signals RD1 and RD2 are output.

Since the circuit arrangement of the main controller is changed according to the arrangement of the FIFO type field memory used as the delay circuit and the number of them, the main controller is not particularly limited to the arrangement of the above main controller 92.

Figure 5:
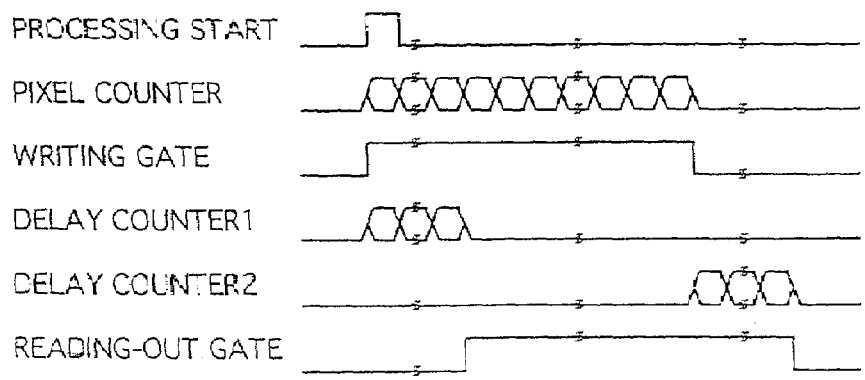
FIG. 5 is an operation timing chart of an embodiment of the image filter circuit of the present invention.

Next, how the image filter circuit operates will be described with reference to the operation timing chart of the image filter circuit shown in FIG. 5.

In the illustrated image filter circuit, the horizontal pixel counter 100 counts the number of pixels in the horizontal direction of a reproduced image, that is, the number of horizontal pixels thereof. When a processing start signal is input to the illustrated horizontal pixel counter 100, first, the number of horizontal pixels of the reproduced image is set to the counter 100 as an initial count value and thereafter the initial value is counted down in synchronism with a pixel clock (not shown). When the count value becomes 0, the counter 100 outputs a count finish signal.

Likewise, the vertical pixel counter 102 counts the number of pixels in the vertical direction of the reproduced image, that is, the number of vertical pixels of the reproduced image. When the processing start signal is input to the illustrated vertical pixel counter 102, first, the number of vertical pixels of the reproduced image is set as an initial count value Thereafter, when the count finish signal is input to the vertical pixel counter 102 from the horizontal pixel counter 100, the initial value is counted down in synchronism with the pixel clock (not shown). When the count value becomes 0, the counter 102 outputs a count finish signal.

The horizontal delay counters 108*a*, 108*b* and the vertical delay counters 110*a*, 110*b* count the number of delays in the horizontal direction and the number of delays in the vertical direction, that is, the number of horizontal delays and the number of vertical delays caused by the FIL 76, respectively. More specifically, the horizontal delay counter 108*a* and the vertical delay counter 110*a* count the start delay times of the reading-out signals RD1 and RD2 from the start of the respective writing signals WR1 and WR2. The horizontal delay counter 108b and the vertical delay counter 110b count the finish end times of the reading-out signals RD1 and RD2.

Operation of the horizontal delay counters 108a, 108b and the vertical delay counters 110a, 110b is fundamentally the same as that of the horizontal pixel counter 100 and the vertical pixel counter 102 except that the number of horizontal pixels and the number of vertical pixels are changed to the number of horizontal delays and the number of vertical delays, respectively and that the processing start signals of the horizontal delay counter 108b and the vertical delay counter 110b are changed to the count finish signal output from the vertical pixel counter 102. Thus, the description of the operation of the horizontal delay counters 108a, 108b and the vertical delay counters 110a, 110b is omitted here.

The SR flip-flops 104a, 104b are set and reset type flip flops. The SR flip-flop 104a outputs a writing gate signal WR and the SR flip-flop 104b outputs a reading-out gate signal RD. The SR flip-flop 104a is set in response to the processing start signal and reset in response to the count finish signal output from the vertical pixel counter 102. The SR flip-flop 104b is set in response to the count finish signal output from the vertical delay counter 110a and reset in response to the count finish signal output from the vertical delay counter 110b.

As shown in, for example, in FIG. 2, each of the divider circuits 106a and 106b is composed of two FIFO field memories connected in parallel with each other as a delay circuit of the filter section 90 in correspondence to the image filter circuit which alternately carries out writing and reading in a unit of two pixels. The divider circuit 106a and 106b generate the writing signals WR1 and WR2 and the reading-out signals RD1 and RD2 for controlling the writing and reading of the DLYs 75a and 75b.

Figure 6:
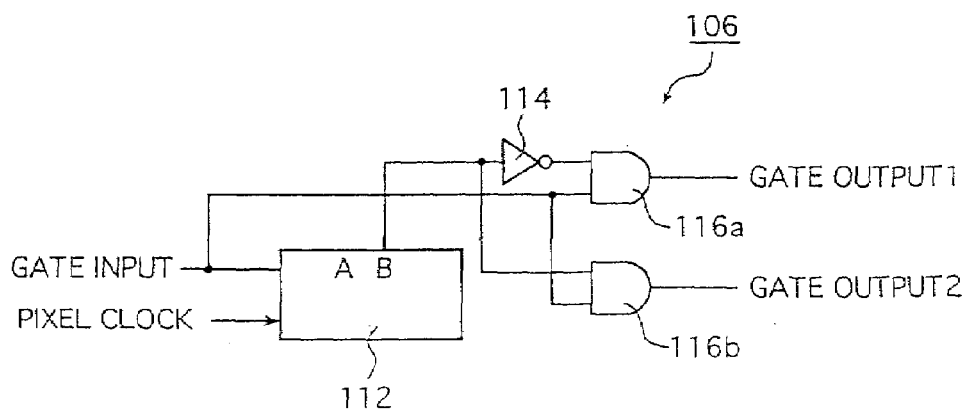
FIG. 6 is a block diagram of an embodiment of a divider circuit.

FIG. 6 shows a block diagram of an embodiment of the divider circuit.

The illustrated divider circuit 106 is composed of a quaternary counter 112, an inverter 114 and AND gates 116a, 116b. The quaternary counter 112 is supplied with a gate input signal and the pixel clock and outputs the high order bit B of a signal to the inverter 114 and the first input terminal of the AND gate 116b. The inverter 114 outputs a signal to the first input terminal of the AND gate 116a and the gate input signal is input to the second input terminals of the AND gates 116a, 116b. Agate output signal 1 is output from the output terminal of the AND gate 116a and a gate output signal 2 is output from the output terminal of the AND gate 116b, respectively.

When the gate input signal is in a non-active state (low level) in the divider circuit 106, that is, when the writing gate signal WR and the reading-out gate signal RD which are the output signals from the SR flip-flops 104a and 104b are reset in the main controller 92 in FIG. 3, the AND gates 116a, 116b and the quaternary counter 112 are disabled. Thus, the gate output signals 1, 2 output from the AND gates 116a, 116b are set to a low level, that is, the writing signals WR1, WR2 and the reading-out signals RD1 and RD2 are set to the low level.

When the gate input signal is in an active state (high level), that is, when the output signals from the SR flip-flops 104a, 104b are set in the main controller 92 in FIG. 3, the AND gates 116a, 116b and the quaternary counter 112 are enabled. Thus, the quaternary counter 112 is counted in synchronism with the pixel clock and each of the gate output signals 1, 2 is repeatedly output from the AND gates 116a, 116b in a unit of two pixels which is alternately inverted such as, for example, 00110011 . . . and 11001100 . . . , respectively.

That is, when the processing start signal is input in the illustrated image filter circuit, the SR flip-flop 104a is set and outputs the writing gate signal WR and the divider circuit 106a alternately outputs the writing signals WR1 and WR2 in a unit of two pixels. At the time, the filtering treatment is carried out at the FIL 76 as well as image signals which are not subjected to the filtering treatment at the FIL 76 is alternately written to the DLYs 75a and 75b in a unit of two pixels.

At the same time, when the processing start signal is input, the number of horizontal pixels is set to the horizontal pixel counter 100 and the number of vertical pixels is set to the vertical pixel counter 102, respectively, as well as the number of horizontal delays is set to the horizontal delay counter 108a and the number of vertical delays is set to the vertical delay counter 110a, respectively. Thereafter, the horizontal pixel counter 100, the vertical pixel counter 102, the horizontal delay counter 108a and the vertical delay counter 110a are counted down in synchronism with the pixel clock (not shown).

Thereafter, when the count value counted by the vertical delay counter 110a becomes 0 and the count finish signal is issued, the SR flip-flop 104b is set and outputs the reading-out gate signal RD and the divider circuit 106b alternately outputs the reading-out signals RD1 and RD2 in a unit of two pixels. At the time, unsharp image signals are output from the FIL 76 as well as the image signals which are not subjected to the filtering treatment at the FIL 76 are alternately read out from the DLYs 75a and 75b.

When the count value counted by the vertical pixel counter 102 becomes 0 and the count finish signal is issued, the SR flip-flop 104a is reset and the output of the writing gate signal WR therefrom is stopped. The output of the writing signals WR1 and WR2 from the divider circuit 106a is also stopped as well as the number of horizontal delays and the number of vertical delays are set to the horizontal delay counter 108b and the vertical delay counter 110b, respectively. Thereafter, the horizontal delay counter 108b and the vertical delay counter 110b are counted down in synchronism with the pixel clock (not shown) in the same manner.

When the count value counted by the vertical delay counter 110b becomes 0 and the count finish signal is output, the SR flip-flop 104b is rest and the output of the reading-out gate signal RD therefrom is stopped and the output of the reading-out signal RD1 and RD2 from the divider circuit 106b is also stopped.

Although the image filter circuit of the present invention have been described above in details, it is needless to say that the present invention is not limited to the above embodiments and various modifications and changes may be made therein in a scope which does not depart from the gist of the present invention.

As described above in details, the image filter circuit of the present invention preferably uses the IIR type filter as the filter for carrying out the filtering treatment for generating the unsharp image signals so as to obtain the dodging effect. It further preferably uses the FIFO type field memories as the delay circuit for delaying image signals which are not subjected to the filtering treatment for a time corresponding to the delay time of image signals having been subjected to the filtering treatment. As a result, the image filter circuit of the present invention, which obtains the unsharp image signals corresponding to an unsharp mask for obtaining a dodging effect, can be made small in size with a simplified circuit arrangement.

What is claimed is:

1. An image processing device for carrying out a dodging treatment, which has a first processing line and a second processing line, to respective lines of which color image signals are input, the first processing line comprising:
- a luminance image signal generator for generating a luminance image signal from said input color image signals;
- a filter for filtering said luminance image signal to generate an unsharp image signal;
- a dynamic range compressor for subjecting said unsharp image signal to a dynamic range compression treatment to generate a compressed unsharp image signal for the dodging treatment;

the second processing line comprising:
- at least one memory for delaying said input color image signals for a time period corresponding to a delay time which occurs as a result of processing in the first line, thereby generating delayed input color image signals, said delay time occurring as a result of processing of said input color image signals;
- an adder for subtracting said compressed unsharp image signal for the dodging treatment from each of said delayed input color image signals to generate processed image signals for the dodging treatment.

2. The device according to claim 1, wherein said filter is an IIR type filter.

3. The device according to claim 1, wherein said at least one memory comprises a plurality of FIFO type field memories disposed in parallel, and while said input color image signals are sequentially written to one FIFO type field memory, said delayed input color image signals are sequentially read-out from one other FIFO type field memory, and, alternatively, while said input color image signals are sequentially written to said one other FIFO type field memory, said delayed input color image signals are sequentially read-out from said one FIFO type field memory.

4. The device according to claim 1, further comprising, a main controller for generating reading and writing signals which control writing to and reading from said at least one memory to control operation timing of said at least one memory in accordance with the delay time of said input color image signals at said filter.

5. The device according to claim 4, wherein said main controller includes a first counter which counts a number of pixels in horizontal and vertical directions of a reproduced image; a first flip-flop which generates said swriting signal during a time period from when said first counter starts counting until the end of counting; a second counter which starts counting a number of horizontal and vertical delays of said input color image signals at said filter, beginning when said first counter starts counting; a third counter which starts counting the number of horizontal and vertical delays of said input color image signals at said filter, after said first counter has finished counting; and a second flip-flop which generates said reading signal after said second counter has finished counting, and until a time period when said third counter finishes counting.

6. The device according to claim 2, wherein said IIR type filter is at least one of a low-pass filter and an all-pass filter.

7. The device according to claim 1, wherein said luminance image signal generator is a matrix calculator.

8. The device according to claim 1, wherein said dynamic range compressor subjects to said dynamic range compression treatment using a dynamic range compression table.

* * * * *